United States Patent
Hsiao et al.

(10) Patent No.: US 8,553,361 B2
(45) Date of Patent: Oct. 8, 2013

(54) PERPENDICULAR WRITE HEAD HAVING A TRAILING SHIELD WITH A SHORT GAP, SHORT THROAT AND HIGH APEX ANGLE FOR IMPROVED LINEAR DENSITY RECORDING

(75) Inventors: Wen-Chien David Hsiao, San Jose, CA (US); Vladimir Nikitin, Campbell, CA (US)

(73) Assignee: HGST Netherlands B.V., Amsterdam (NL)

( * ) Notice: Subject to any disclaimer, the term of this patent is extended or adjusted under 35 U.S.C. 154(b) by 865 days.

(21) Appl. No.: 12/109,940

(22) Filed: Apr. 25, 2008

(65) Prior Publication Data
US 2009/0268350 A1   Oct. 29, 2009

(51) Int. Cl.
*G11B 5/17* (2006.01)
(52) U.S. Cl.
USPC ........................................ 360/125.3
(58) Field of Classification Search
USPC ........................................ 360/125.3
See application file for complete search history.

(56) References Cited

U.S. PATENT DOCUMENTS

| | | | |
|---|---|---|---|
| 5,245,493 A * | 9/1993 | Kawabe et al. | 360/125.53 |
| 5,621,596 A | 4/1997 | Santini | 360/126 |
| 5,805,391 A * | 9/1998 | Chang et al. | 360/317 |
| 6,504,678 B1 | 1/2003 | Kamijima | 360/126 |
| 6,510,024 B2 | 1/2003 | Otsuka et al. | 360/126 |
| 6,614,620 B2 * | 9/2003 | Tagawa et al. | 360/125.65 |
| 6,624,971 B1 | 9/2003 | Sasaki | 360/126 |
| 6,694,604 B2 | 2/2004 | Santini | 29/603.14 |
| 6,721,129 B2 | 4/2004 | Lam | 360/119 |
| 6,785,953 B2 * | 9/2004 | Santini | 29/603.14 |
| 6,826,014 B2 | 11/2004 | Lam et al. | 360/126 |
| 7,095,585 B2 | 8/2006 | Payne et al. | 360/125 |
| 7,110,217 B2 | 9/2006 | Lee et al. | 360/126 |
| 2005/0219743 A1 | 10/2005 | Guan et al. | 360/125 |
| 2005/0219747 A1 * | 10/2005 | Hsu et al. | 360/126 |
| 2006/0291096 A1 * | 12/2006 | Sasaki et al. | 360/126 |

* cited by examiner

*Primary Examiner* — David D Davis
(74) *Attorney, Agent, or Firm* — Zilka-Kotab, PC (57) ABSTRACT

A magnetic write head having a trailing shield configured to optimize both write field strength and field gradient. The write head includes a write pole, a trailing gap layer formed over the trailing edge of the write pole and a trailing magnetic shield formed over the non-magnetic write gap layer such that the non-magnetic write gap layer is sandwiched between the trailing magnetic shield and the write pole. The trailing magnetic shield has a first surface disposed at the air bearing surface and second surface disposed away from the air bearing surface that is tapered at an angle of 20 to 75 degrees relative to the trailing edge of the write pole.

18 Claims, 6 Drawing Sheets

PERPENDICULAR WRITE HEAD HAVING A TRAILING SHIELD WITH A SHORT GAP, SHORT THROAT AND HIGH APEX ANGLE FOR IMPROVED LINEAR DENSITY RECORDING

FIELD OF THE INVENTION

The present invention relates to perpendicular magnetic recording and more particularly to a method for manufacturing a magnetic write head having a tapered, stepped trailing shield structure for improved magnetic performance.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head has traditionally included a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs, a GMR or TMR sensor has been employed for sensing magnetic fields from the rotating magnetic disk. The sensor includes a nonmagnetic conductive layer, or barrier layer, sandwiched between first and second ferromagnetic layers, referred to as a pinned layer and a free layer. First and second leads are connected to the sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to cos Θ, where Θ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

SUMMARY OF THE INVENTION

The present invention provides a magnetic write head having a trailing shield configured to optimize both write field strength and field gradient. The write head includes a write pole, a trailing gap layer formed over the trailing edge of the write pole and a trailing magnetic shield formed over the non-magnetic write gap layer such that the non-magnetic write gap layer is sandwiched between the trailing magnetic shield and the write pole. The trailing magnetic shield has a first surface disposed at the air bearing surface and second surface disposed away from the air bearing surface that is tapered at an angle of 20 to 75 degrees relative to the trailing edge of the write pole.

This amount of taper of the second surface of the trailing magnetic shield advantageously allows the trailing shield to have a small throat height, while also simultaneously avoiding saturation of the trailing magnetic pole and also preventing the loss of magnetic flux from the write pole to the trailing shield.

This amount of taper has been found to provide an optimal balance of both write field strength and high field gradient. This allows the trailing shield to be built with a small throat height of 0-25 nm. Also, because the trailing shield design prevents flux loss, the non-magnetic trailing gap can be made thin, such as 15 to 25 nm.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
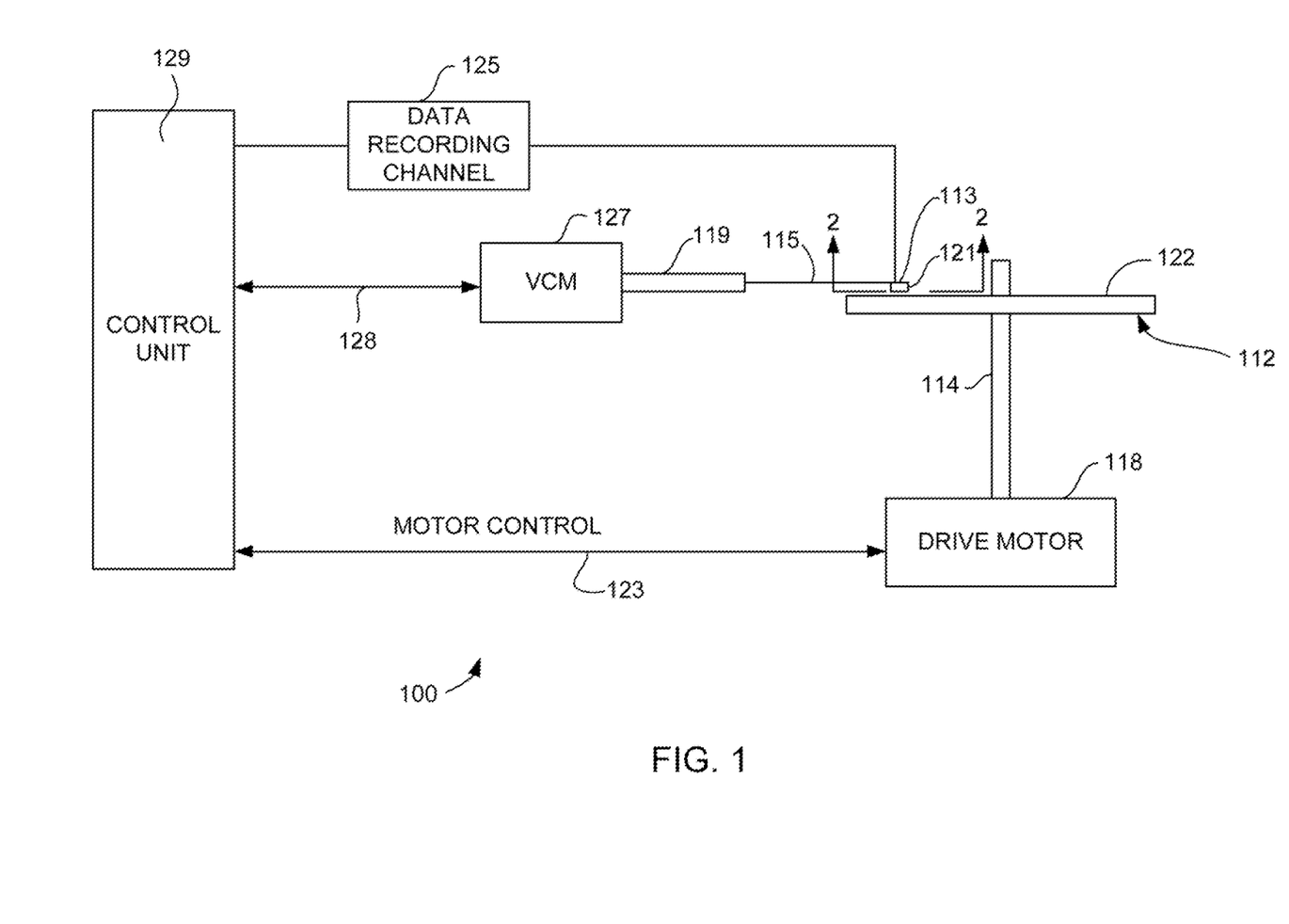
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
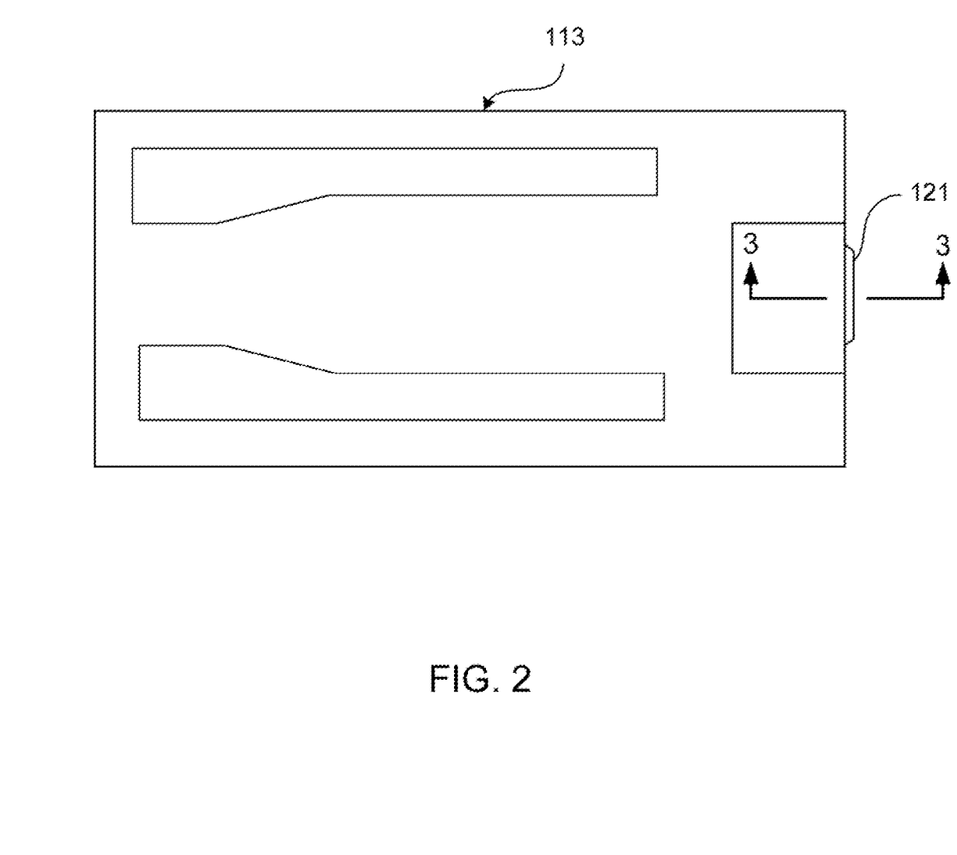
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
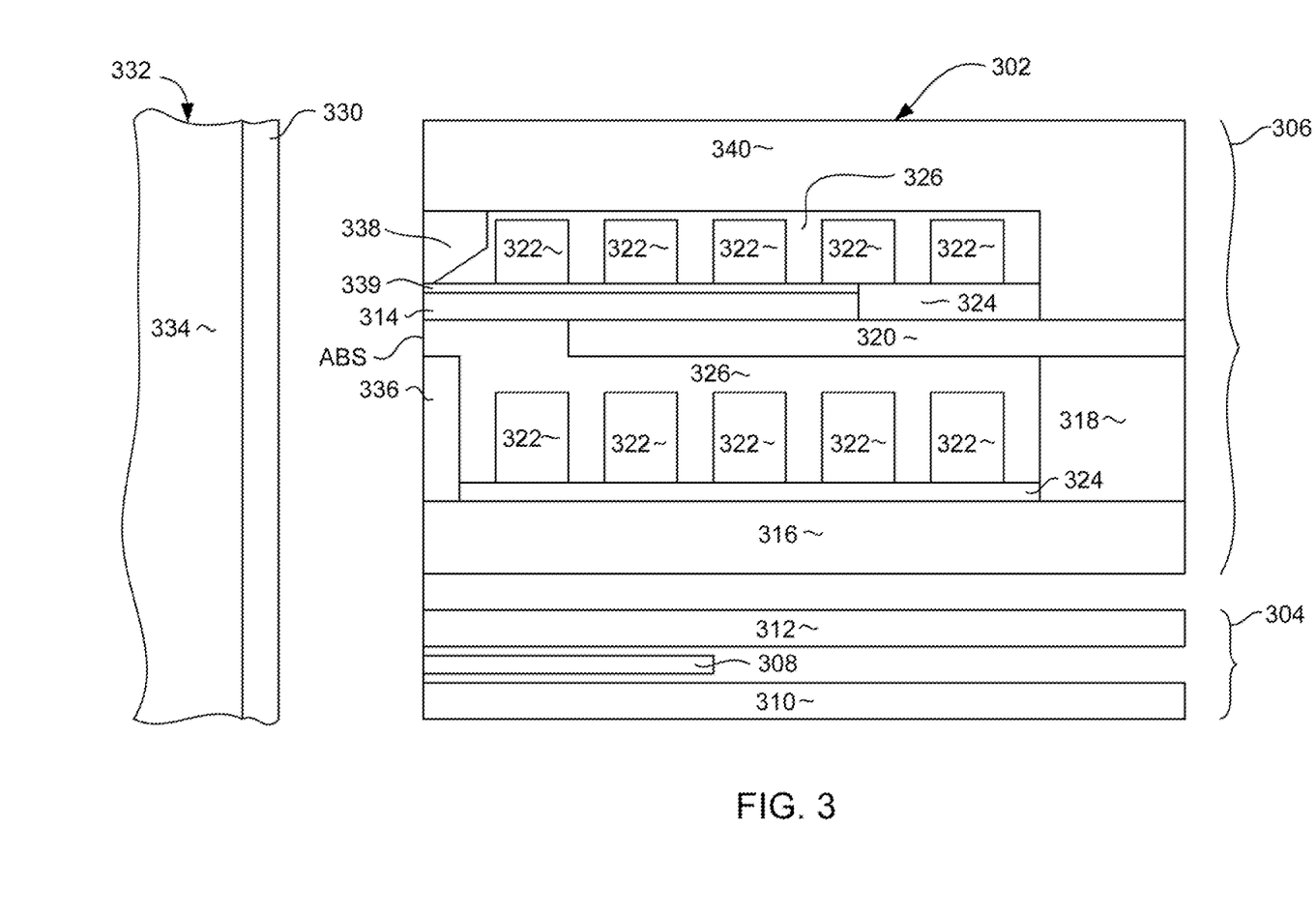
FIG. 3 is a cross sectional view of a magnetic head, taken from line 3-3 of FIG. 2 and rotated 90 degrees counterclockwise, of a magnetic write head according to an embodiment of the present invention.

With reference now to FIG. 3, the invention can be embodied in a magnetic head 302. The magnetic head 302 includes a read head 304 and a write head 306. The read head 304 includes a magnetoresistive sensor 308, which can be a GMR, TMR, or some other type of sensor. The magnetoresistive sensor 308 is located between first and second magnetic shields 310, 312.

The write head 306 includes a magnetic write pole 314 and a magnetic return pole 316. The write pole 314 can be formed upon a magnetic shaping layer 320, and a magnetic back gap layer 318 magnetically connects the write pole 314 and shaping layer 320 with the return pole 316 in a region removed from the air bearing surface (ABS). A write coil 322 (shown in cross section in FIG. 3) passes between the write pole and shaping layer 314, 320 and the return pole 316, and may also pass above the write pole 314 and shaping layer 320. The write coil can be a helical coil or can be one or more pancake coils. The write coil 322 can be formed upon an insulation layer 324 and can be embedded in a coil insulation layer 326 such as alumina and or hard baked photoresist.

In operation, when an electrical current flows through the write coil 322. A resulting magnetic field causes a magnetic flux to flow through the return pole 316, back gap 318, shaping layer 320 and write pole 314. This causes a magnetic write field to be emitted from the tip of the write pole 314 toward a magnetic medium 332. The write pole 314 has a cross section at the ABS that is much smaller than the cross section of the return pole 316 at the ABS. Therefore, the magnetic field emitting from the write pole 314 is sufficiently dense and strong that it can write a data bit to a magnetically hard top layer 330 of the magnetic medium 332. The magnetic flux then flows through a magnetically softer under-layer 334, and returns back to the return pole 316, where it is sufficiently spread out and week that it does not erase the data bit recorded by the write head 314. A magnetic pedestal 336 can be provided at the ABS, and attached to the leading return pole 316 to act as a magnetic shield to prevent stray field from the write coil 322 from inadvertently reaching the magnetic media 332.

In order to increase write field gradient, and therefore, increase the speed with which the write head 306 can write data, a trailing, magnetic shield 338 can be provided. The trailing, magnetic shield 338 is separated from the write pole by a non-magnetic write gap 339, and may be connected with the shaping layer 320 and/or back gap 318 by a trailing return pole 340. The trailing shield 338 attracts the magnetic field from the write pole 314, which slightly cants the angle of the magnetic field emitting from the write pole 314. This canting of the write field increases the speed with which write field polarity can be switched by increasing the field gradient. The non-magnetic trailing gap layer 339 can be constructed of a material such as Rh, Ir or Ta.

The use of the trailing shield involves a tradeoff between write field gradient and write field strength. Certain factors increase the write field gradient, but reduce the write field strength, whereas other factors have the opposite effect, increasing the write field strength while decreasing field gradient. For example, if the trailing gap is too thin, or if the trailing shield extends over the too much of the write pole (i.e. has too large of a throat height), then the field gradient will increase, but an excessive amount of magnetic flux from the write pole 314 will be lost to the trailing shield 338. The present invention mitigates this tradeoff, providing both field strength and field gradient.

Figure 4:
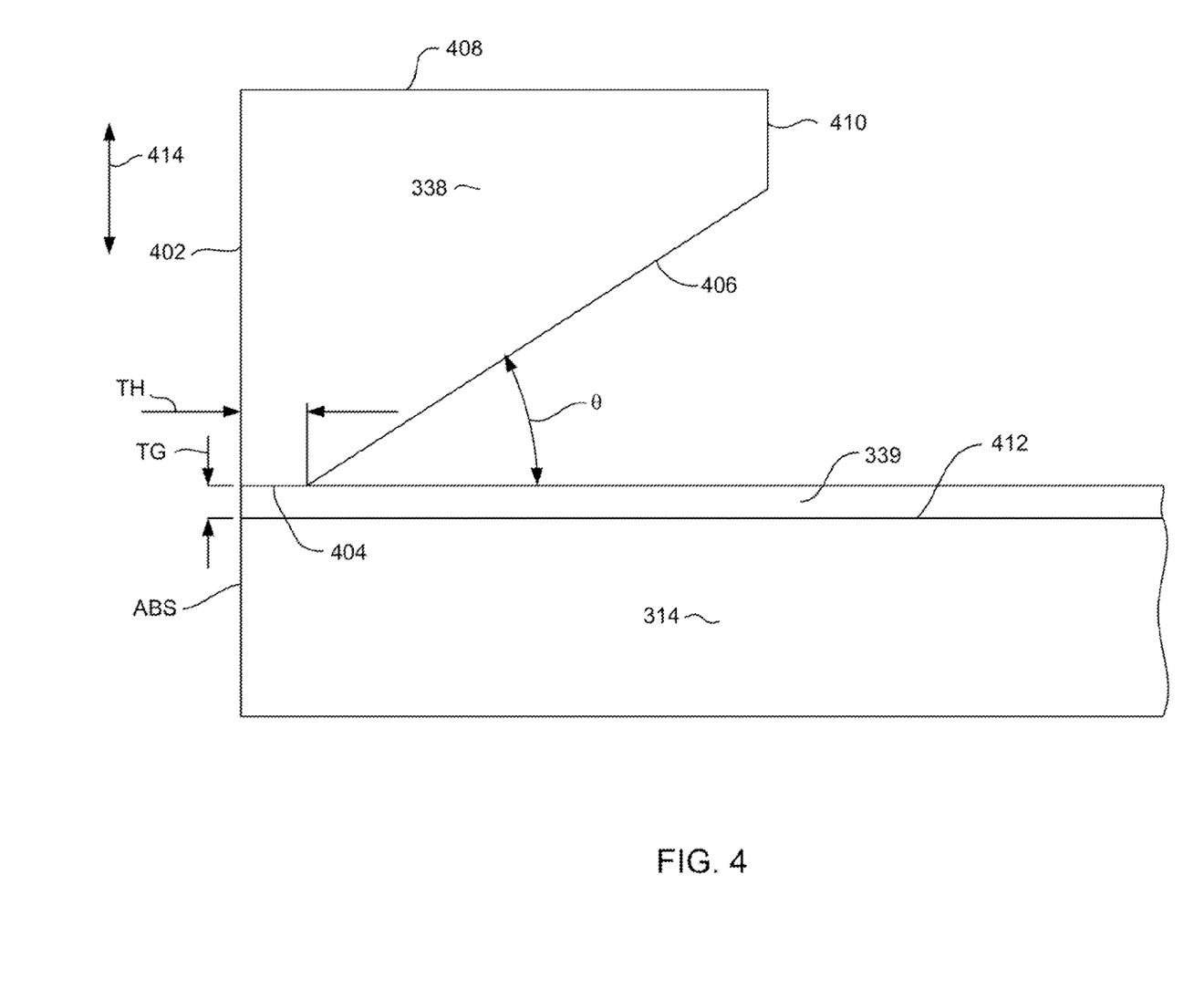
FIG. 4 is an enlarged, cross sectional view of a portion of a magnetic write head.

FIG. 4 shows an enlarged view of a trailing shield 338, write pole 314 and trailing gap 339, sandwiched between the trailing shield 338 and write pole 314. As can be seen, the trailing shield 338 has a surface 402 that faces the air bearing surface (ABS) of the write head. The trailing shield 338 also has a leading edge surface 404 that is in contact with the trailing gap layer, and a tapered edge surface 406 that is located away from the ABS. The trailing pole can also have a trailing surface 408, and can have a back surface 410 opposite the ABS, however, the tapered edge 406 could also extend all of the way to the trailing edge 408 of the trailing shield 338. Other configurations of, for example, the back edge 410 and trailing edge 408 are also possible.

As can be seen, then, length of the leading edge 404, as measured from the ABS edge 402 to the beginning of the tapered edge 406 defines the throat height (TH) of the trailing shield 338. Keeping this throat height TH small ensures that little magnetic flux will be lost to the trailing shield 338 from the write pole. Therefore, the throat height TH is preferably 0 to 25 nm. In addition, it can be seen that the tapered edge 406 of the trailing shield tapers away from the write pole 314. In order to provide optimal performance, the tapered edge 406 forms an angle $\theta$ of 20 to 75 degrees with respect to a plane that is parallel with the trailing edge surface 412 of the write pole 339. This angle $\theta$ could also be defined as being measured relative to a plane that is perpendicular to both the ABS and the data track direction 414.

This tapered back edge 406, formed at the angle described above, provides several advantages. For example, the throat height TH can be small to prevent flux from leaking to the trailing shield. At the same time, the taper 406 prevents the trailing shield 338 from saturating. This shape also facilitates manufacture, by avoiding the formation of pin holes or voids in the trailing shield, which might otherwise result from variations in the manufacturing processes used to form the trailing shield, such as photolithography and lapping.

Another advantage of the tapered shape 406 and the small throat height made possible by the taper, is that the trailing gap TG can be smaller. The trailing gap TG is the distance between the trailing edge 412 of the write pole 314 and the leading edge 404 of the trailing shield 338. This trailing gap TG is also the thickness of the non-magnetic trailing gap layer 339. Because the narrow throat height TH and tapered shape 406 greatly reduces flux loss from the write pole 314 to the trailing shield 338, the trailing gap TG can be made smaller, without the risk of losing flux and reducing the write field. As a result, the trailing gap TG thickness can be, for example, 15-25 nm. This smaller gap TG improves the effectiveness of the trailing shield 338, further improving field gradient.

Figure 5:
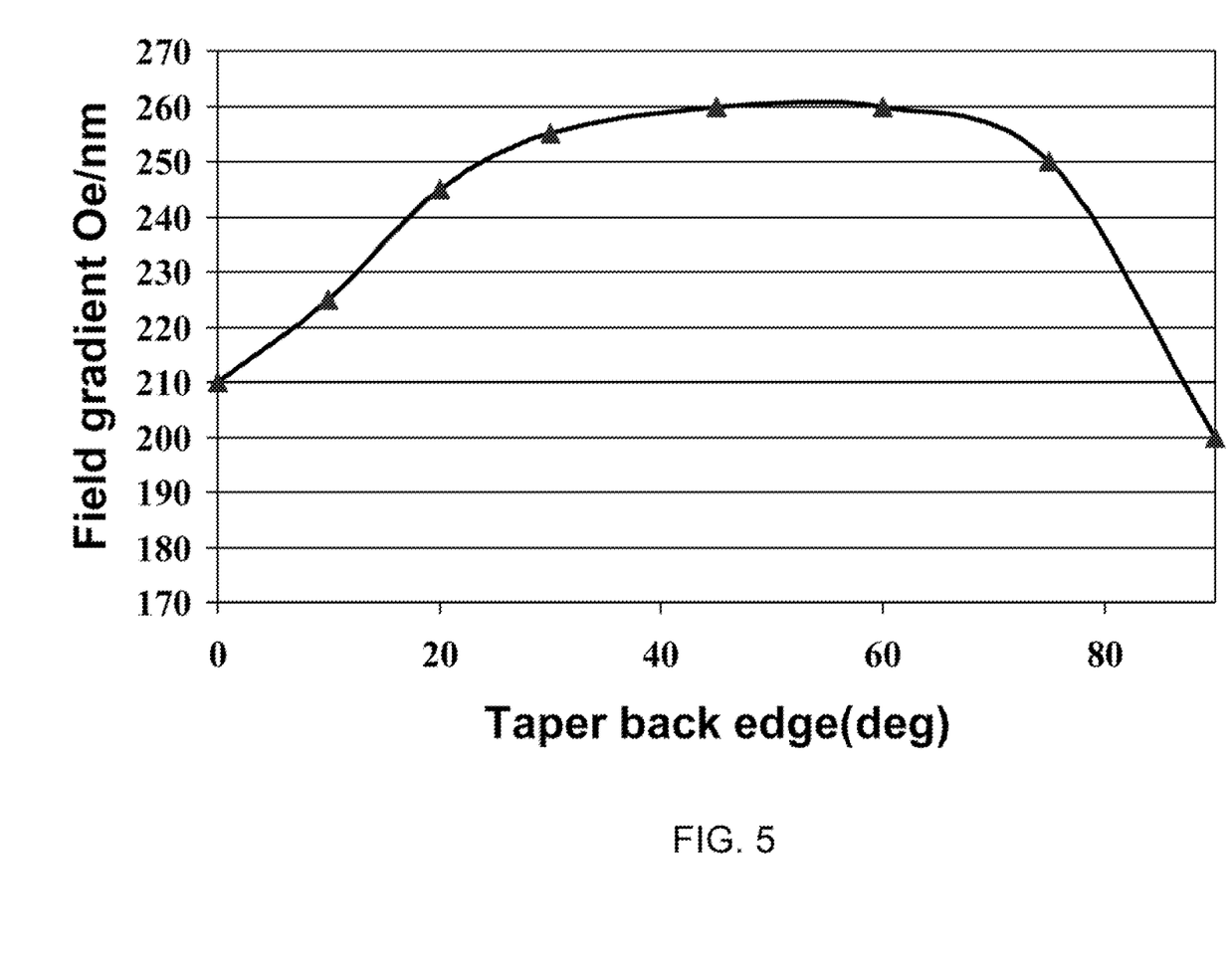
FIG. 5 is a graph illustrating a relationship between write field gradient and back taper angle of a trailing magnetic shield.

The inventors have found that by controlling the angle $\theta$ of the tapered edge surface 406, write field and field gradient can be maximized. If the taper angle $\theta$ is less than 20 degrees, too much flux will be lost to the trailing shield 338 and the benefit of the taper will be lost. If the angle $\theta$ is greater than 75 degrees, the trailing shield 338 will magnetically saturate and field gradient will suffer. FIG. 5 graphically illustrates the relationship between field gradient and taper angle $\theta$. As can be seen, maximum field gradient is realized when the taper angle $\theta$ is between about 20 and 75 degrees.

Figure 6:
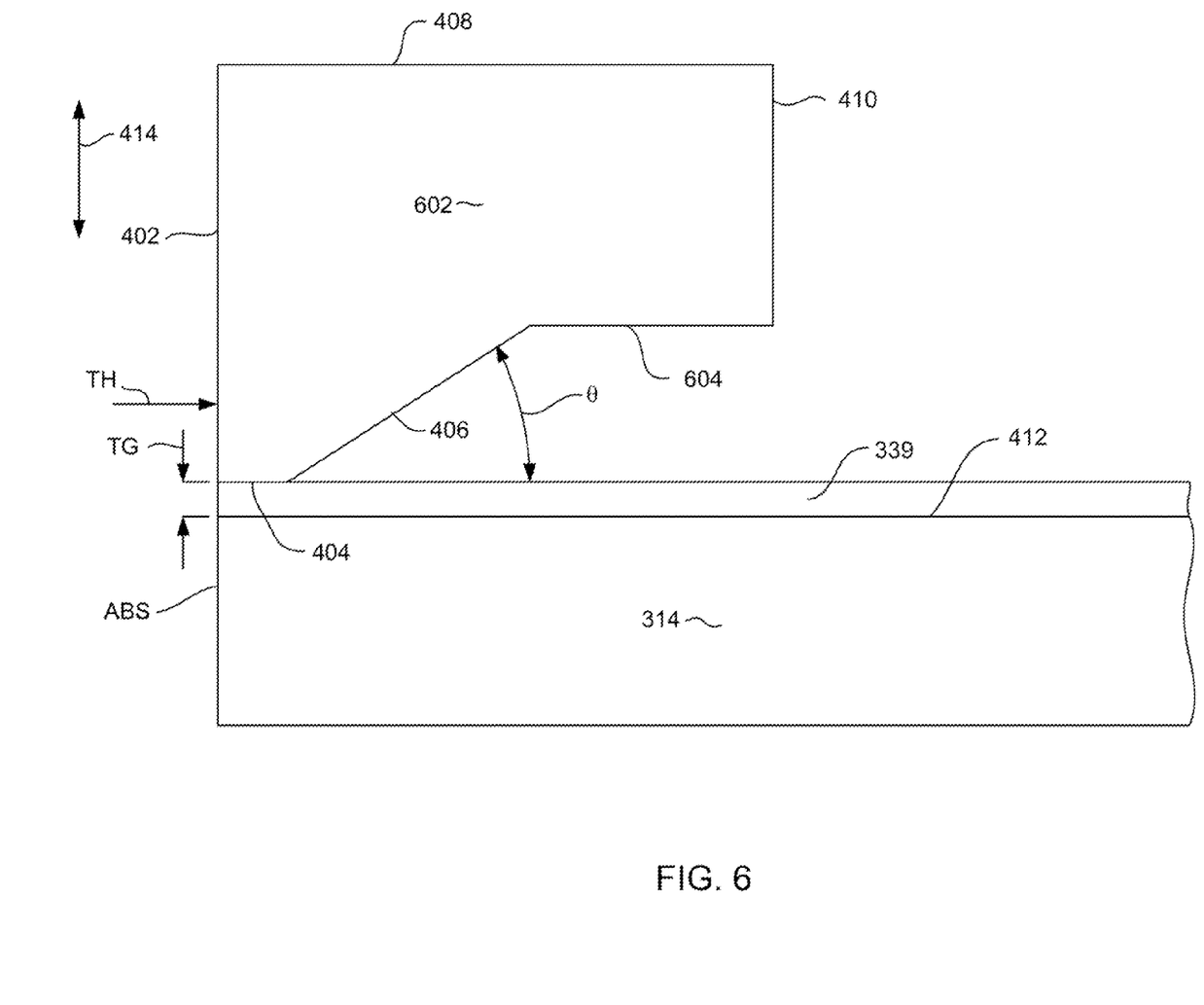
FIG. 6 is an enlarged, cross sectional view of a portion of a magnetic write head according to another embodiment of the invention.

With reference now to FIG. 6, another possible embodiment of the invention is described. This embodiment includes a trailing shield 602 having a tapered edge 406 that is inclined at an angle $\theta$ of between 20 and 75 degrees with respect to the trailing edge surface 412 of the write pole 314, similar to the previously described embodiment. However, the tapered edge 406 extends to a surface 604 that is substantially parallel with the trailing edge surface 412 of the write pole. Although the transition from the surface 406 to the surface 604 is shown as being a sharp transition, the transition could also be smooth or curved. Also, the surface 604 need not be exactly parallel with the trailing edge surface 412 of the write pole 314, but could be at some angle less than the angle $\theta$.

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A write head for perpendicular magnetic recording, comprising:
    a magnetic write pole having an end extending to an air bearing surface, the magnetic write pole being configured to emit a magnetic write field in a direction substantially perpendicular to the air bearing surface, the magnetic write pole having a trailing edge the entirety of which is oriented along a plane that is perpendicular to the air bearing surface and perpendicular to a data track direction;
    a non-magnetic trailing gap layer adjacent to the trailing edge of the write pole; and
    a magnetic trailing shield adjacent to the non-magnetic gap layer, such that the non-magnetic trailing gap layer is sandwiched between the magnetic trailing shield and the trailing edge of the write pole, the magnetic trailing shield having a first surface located at and parallel with the air bearing surface, and a second surface opposite the first surface and formed at an angle of 20-75 degrees with respect to the trailing edge surface of the write pole.

2. A magnetic write head as in claim 1 wherein the magnetic trailing shield has a leading edge surface contacting the non-magnetic trailing gap layer, the leading edge surface extending from the first surface to the second surface, the length of the leading surface defining a throat height of the trailing magnetic shield.

3. A magnetic write head as in claim 2 wherein the throat height of the trailing magnetic shield is not greater than 25 nm.

4. A write head as in claim 2 wherein the throat height is not greater than 25 nm and the non-magnetic trailing gap layer has a thickness of 15 to 25 nm.

5. A magnetic write head as in claim 1 wherein the non-magnetic trailing gap layer has a thickness of 15 to 25 nm.

6. A magnetic write head as in claim 1 further comprising a trailing magnetic return pole connected with the trailing magnetic shield.

7. A write head as in claim 1 wherein the non-magnetic trailing gap layer comprises Rh, Ir or Ta.

8. A write head as in claim 1 wherein the trailing magnetic shield has a back edge surface opposite the first surface and a trailing edge surface located away from the write pole, the back edge surface extending from the tapered surface to the trailing edge surface.

9. A write head as in claim 1 wherein the trailing magnetic shield has a trailing edge surface located away from the write pole and a leading edge surface located toward the write pole, and wherein the second surface extends from the trailing edge surface to the leading edge surface.

10. A magnetic write head for perpendicular magnetic data recording, comprising:
a leading magnetic return pole having an end disposed toward an air bearing surface;
a magnetic write pole having an end disposed toward the air bearing surface the magnetic return pole having a surface area at the air bearing surface that is much smaller than a surface area of the leading return pole at the air bearing surface, in order to allow the write pole to emit a magnetic write field in a direction substantially perpendicular to the air bearing surface, the write pole being magnetically connected with the leading magnetic return pole in a region away from the air bearing surface, the magnetic write pole having a trailing edge the entirety of which is oriented along a plane that is perpendicular to the air bearing surface;
a non-magnetic trailing gap layer formed on a trailing edge of the write pole;
a trailing magnetic shield located at the air bearing surface with the non-magnetic trailing gap being sandwiched between the trailing magnetic shield and the trailing edge of the write pole; the trailing magnetic shield further comprising a first surface disposed at the air bearing surface, and a second surface located away from the air bearing surface and being tapered at an angle of 20 to 75 degrees with respect to the trailing edge surface of the write pole; and
a trailing magnetic return pole magnetically connected with the trailing magnetic shield, and magnetically connected with the leading magnetic return pole and write pole in a region removed from the air bearing surface.

11. A magnetic write head as in claim 10 wherein a distance between the first and second surfaces at a point closest to the non-magnetic gap layer defines a throat height of the trailing magnetic shield.

12. A magnetic write head as in claim 11 wherein the throat height is not greater than 25 nm.

13. A write head as in claim 11 wherein the throat height is not greater than 25 nm and the non-magnetic trailing gap layer has a thickness of 15 to 25 nm.

14. A magnetic write head as in claim 10 wherein the non-magnetic trailing gap layer has a thickness of 15 to 25 nm.

15. A magnetic write head as in claim 10 wherein the non-magnetic trailing gap layer comprises Ir, Ru or Ta.

16. A magnetic write head as in claim 10 wherein the trailing magnetic shield has a back edge surface opposite the first surface and a trailing edge surface located away from the write pole, the back edge surface extending from the tapered surface to the trailing edge surface.

17. A write head as in claim 10 wherein the trailing magnetic shield has a trailing edge surface located away from the write pole and a leading edge surface located toward the write pole, and wherein the second surface extends from the trailing edge surface to the leading edge surface.

18. A magnetic data storage system, comprising:
a housing;
a magnetic medium rotatably mounted within the housing;
an actuator pivotally mounted within the housing;
a slider connected with the actuator for movement adjacent to a surface of the magnetic medium;
a magnotoresistive sensor connected with the slider; and
a magnetic write head connected with the slider, the magnetic write head further comprising:
a leading magnetic return pole having an end disposed toward an air bearing surface;
a magnetic write pole having an end disposed toward the air bearing surface the magnetic return pole having a surface area at the air bearing surface that is much smaller than a surface area of the leading return pole at the air bearing surface, in order to allow the write pole to emit a magnetic write field in a direction substantially perpendicular to the air bearing surface, the write pole being magnetically connected with the leading magnetic return pole in a region away from the air bearing surface, the magnetic write pole having a trailing edge the entirety of which is oriented along a plane that is perpendicular to the air bearing surface;
a non-magnetic trailing gap layer formed on a trailing edge of the write pole;
a trailing magnetic shield located at the air bearing surface with the non-magnetic trailing gap being sandwiched between the trailing magnetic shield and the trailing edge of the write pole; the trailing magnetic shield further comprising a first surface disposed at the air bearing surface, and a second surface located away from the air bearing surface and being tapered at an angle of 20 to 75 degrees with respect to the trailing edge surface of the write pole; and
a trailing magnetic return pole magnetically connected with the trailing magnetic shield, and magnetically connected with the leading magnetic return pole and write pole in a region removed from the air bearing surface.

* * * * *